(12) United States Patent
Govindarajan et al.

(10) Patent No.: US 11,216,800 B2
(45) Date of Patent: Jan. 4, 2022

(54) DEVICE FOR FACILITATION OF PAYMENTS

(71) Applicant: PAYPAL, INC., San Jose, CA (US)

(72) Inventors: Satish Govindarajan, Los Altos, CA (US); Carlos Manuel Rivas, Redwood City, CA (US); Tinyen Shih, San Jose, CA (US); Anantharaj Uruthiralingam, San Jose, CA (US); Guhan Senguttuvan, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 49 days.

(21) Appl. No.: 16/565,194

(22) Filed: Sep. 9, 2019

(65) Prior Publication Data

US 2021/0073784 A1     Mar. 11, 2021

(51) Int. Cl.
*G06Q 20/32* (2012.01)
*G06Q 20/40* (2012.01)
*G07F 7/08* (2006.01)
*G06Q 20/34* (2012.01)

(52) U.S. Cl.
CPC ..... *G06Q 20/3227* (2013.01); *G06Q 20/3278* (2013.01); *G06Q 20/40145* (2013.01); *G06Q 20/34* (2013.01); *G07F 7/088* (2013.01)

(58) Field of Classification Search
None
See application file for complete search history.

(56) References Cited

U.S. PATENT DOCUMENTS

| | | | |
|---|---|---|---|
| 7,357,309 B2 | 4/2008 | Ghosh et al. | |
| 8,991,696 B1* | 3/2015 | Daniel | G07C 9/257 235/380 |
| 9,390,297 B2 | 7/2016 | Babu et al. | |
| 9,495,675 B2* | 11/2016 | Sather | G06Q 20/347 |
| 10,410,021 B1* | 9/2019 | Razaghi | H04M 17/023 |
| 2013/0173475 A1* | 7/2013 | Lund | G06Q 20/32 705/67 |
| 2014/0131442 A1 | 5/2014 | Morrow et al. | |
| 2014/0297529 A1* | 10/2014 | Wallaja | G06Q 20/353 705/44 |
| 2016/0269399 A1* | 9/2016 | Abreu | H04L 63/0861 |

* cited by examiner

*Primary Examiner* — Kristy A Haupt
(74) *Attorney, Agent, or Firm* — Haynes and Boone, LLP (57) ABSTRACT

A payment device comprising of a housing, a slot for insertion of a user instrument located on a front surface of the housing, and wherein the housing includes a smart card interface integrated circuit that is configured to read an EMV chip located on the user instrument, and a universal serial bus (USB) type C male connector configured to be inserted into a female connector on a computing device, wherein the USB type C male connector is located on a back surface of the housing, and wherein a size of the USB type C male connector is configured so that when the USB type C male connector is inserted into the female connector on the computing device, the back surface of the housing is within a distance of three centimeters of a surface of the computing device.

21 Claims, 11 Drawing Sheets

DEVICE FOR FACILITATION OF PAYMENTS

TECHNICAL FIELD

The present disclosure relates to payments, and more particularly to a device that facilitates payments.

BACKGROUND

The payments landscape has changed drastically over the past decade. This is primarily due to financial technology platforms that have allowed consumers to have simple and frictionless shopping experiences online, while also allowing consumers to transfer money to their family and friends via their computers and mobile devices. Furthermore, with the number of merchants and service providers that utilize financial technology platforms to accept payments from their customers, there is a need for a compact payment device that can be coupled with a computing or mobile device to facilitate financial transactions.

DETAILED DESCRIPTION

Embodiments of the present disclosure provide a device and a method. In the example embodiment, the present disclosure describes a payment device. The payment device comprises of a housing, a slot for insertion of a user instrument located on a front surface of the housing, and wherein the housing includes a smart card interface integrated circuit that is configured to read an EMV chip located on the user instrument, and a universal serial bus (USB) type C male connector configured to be inserted into a female connector on a computing device, wherein the USB type C male connector is located on a back surface of the housing, and wherein a size of the USB type C male connector is configured so that when the USB type C male connector is inserted into the female connector on the computing device, the back surface of the housing is within a distance of three centimeters of a surface of the computing device.

In an alternative embodiment, the payment device comprises a housing, a slot for insertion of a user instrument located on a front surface of the housing, and wherein the housing includes a smart card interface integrated circuit that is configured to read an EMV chip located on the user instrument, and a universal serial bus type C or micro-USB male connector configured to be inserted into a female connector on a computing device, wherein the USB type C or micro-USB male connector is located on a back surface of the housing, and wherein a size of the USB type C or micro-USB male connector is configured so that when the USB type C or micro-USB male connector is inserted into the female connector on the computing device, the back surface of the housing is within a distance of two centimeters of a surface of the computing device.

In a further embodiment, the present disclosure describes a method as follows. In response to detecting a user instrument inserted into a payment device, a computing device causes a request for biometric information to be provided to a user associated with the user instrument. In response to detecting reception of the biometric information, the computing device causes the biometric information to be loaded onto the user instrument. The computing device updates a record in a database associated with the user associated with the user instrument to include the biometric information.

In the example embodiment, the present disclosure provides an improved payment device that is capable of reading a payment instrument, such as a credit card, by way of the payment instrument being inserted, and further is capable of communicating received payment information to a mobile or computing device via USB-C or micro USB port in order to facilitate a transaction. Furthermore, in one or more embodiments, the payment device may be utilized by a payment application located on a coupled computing device or mobile device to receive authentication information from a user for the purpose of authenticating a user. For example, in one or more embodiments, the payment device may be utilized to receive an authentication instrument, such as an ID, or biometric information via a biometric receiver located on the payment device. In addition, in further embodiments, the payment device may be utilized to load biometric information onto an instrument, such as a financial instrument.

Embodiments of the present disclosure will now be described in detail with reference to the accompanying Figures.

Figure 1:
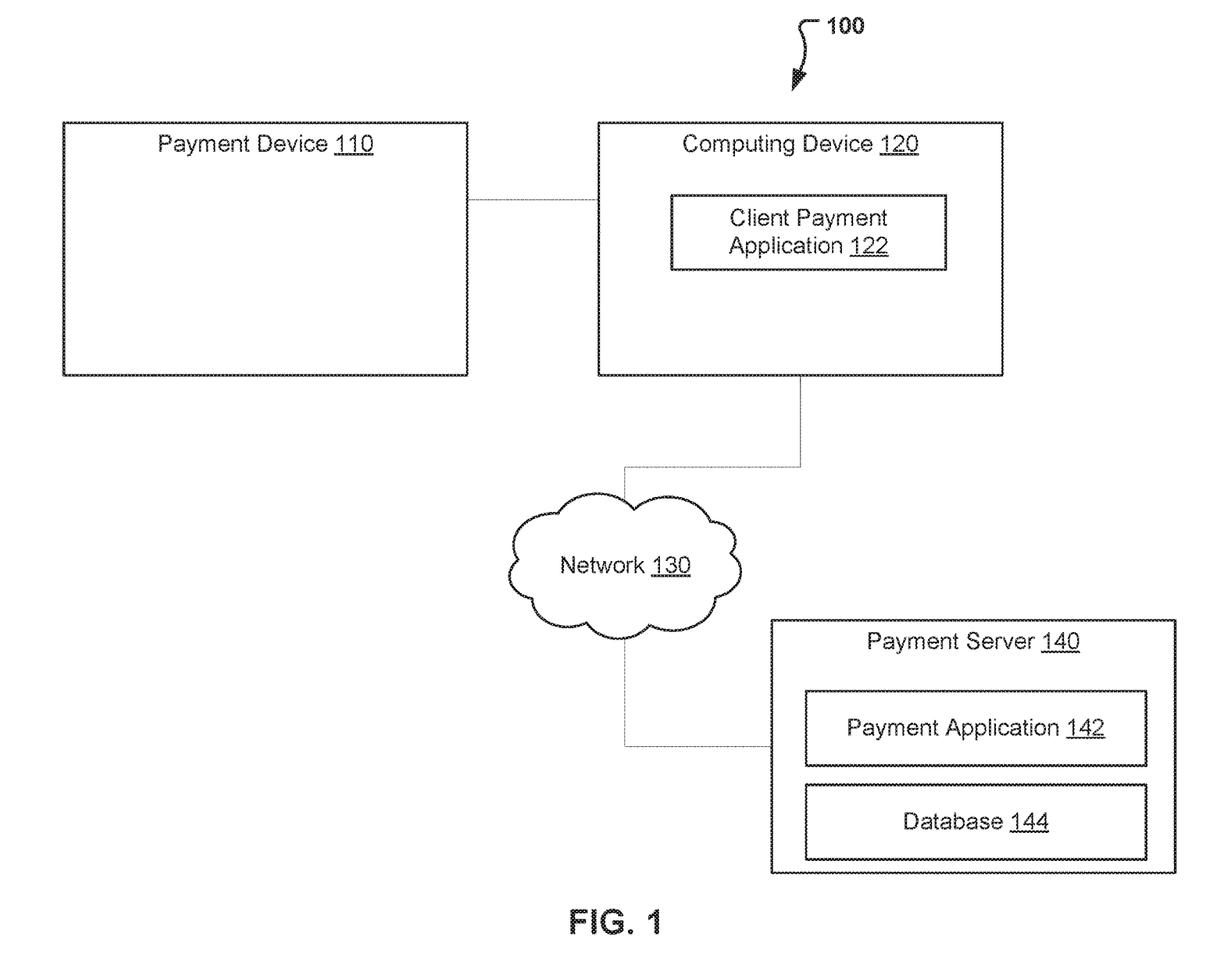
FIG. 1 illustrates a payment system, in accordance with an embodiment.

FIG. 1 illustrates payment system 100, in accordance with an embodiment. In the example embodiment, payment system 100 includes payment device 110, computing device 120 and payment server 140 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a Bluetooth network, a local area network (LAN), or a wide area network (WAN). In general, network 130 can be any combination of connections and protocols that will support communications between computing devices, such as between computing device 120 and payment server 140.

In the example embodiment, computing device 120 includes client payment application 122. In the example embodiment, computing device 120 is a mobile device, however, in other embodiments, computing device 120 may be a desktop computer, a laptop computer, a tablet computer, a handheld device, a thin client, or any other electronic device or computing system capable of receiving and sending data to and from other computing devices, such as payment server 140, via network 130. Computing device 120 is described in more detail with regard to the figures.

In the example embodiment, client payment application 122 is a client-side application, corresponding to the server-side payment application 142, that is capable of transmitting requests to payment application 142 and is further capable of providing received information to a user of computing device 120 via a user interface. Client payment application 122 is described in more detail with regard to the figures.

In the example embodiment, payment device 110 is a compact payment device that includes a slot that is capable accepting an instrument, such as a financial instrument. In the example embodiment, payment device 110 is further capable of reading an EMV chip financial instrument, such as an EMV credit card. Furthermore, in the example embodiment, payment device 110 is capable of being coupled to computing device 120 via a USB-C or micro USB connection. Payment device 110 is described in further detail with regard to the figures.

In the example embodiment, payment server 140 includes payment application 142, database 144. In the example embodiment, payment server 140 may be a desktop computer, a laptop computer, a tablet computer, a mobile device, a handheld device, a thin client, or any other electronic device or computing system capable of receiving and sending data to and from other computing devices, such as computing device 120, via network 130. Although not shown, optionally, payment server 140 can comprise a cluster of servers executing the same software to collectively process requests as distributed by a front-end server and a load balancer. In the example embodiment, payment server 140 is a computing device that is optimized for the support of applications that reside on payment server 140, such as payment application 142, and for the support of network requests related to payment application 142. Payment server 140 is described in more detail with regard to the figures.

In the example embodiment, database 144 is a database that includes information that corresponds to one or more users (and/or merchants) associated with the service provider associated with payment server 140, such as one or more user preferences, user transactional history, user transaction habits, user financial information, user authentication information, user preferences, user connections (other users that a user may be linked to, connected with, etc.), and additional user information. Furthermore, database 144 may include merchant information such as merchant financial information, merchant transactional history, merchant authentication information, merchant preferences, and additional merchant information. Database 144 is described in more detail with regard to the figures.

In the example embodiment, payment application 142 is a server-side application, corresponding to the client-side applications such as client payment application 122. While in the example embodiment, payment application 142 is a payment application, in other embodiments, payment application 142 (and the corresponding client applications) may be a social media application, an e-commerce application, or a different type of application (that has payment ability). In the example embodiment, payment application 142 is capable of receiving information from client applications and further capable of responding to requests from corresponding client applications. In addition, in the example embodiment, payment application 142 is capable of detecting a purchase made by a user via payment device 110 and computing device 120, and further capable of performing authentication and verification service for the transaction. Payment application 142 is described in more detail with regard to the figures.

Figure 2:
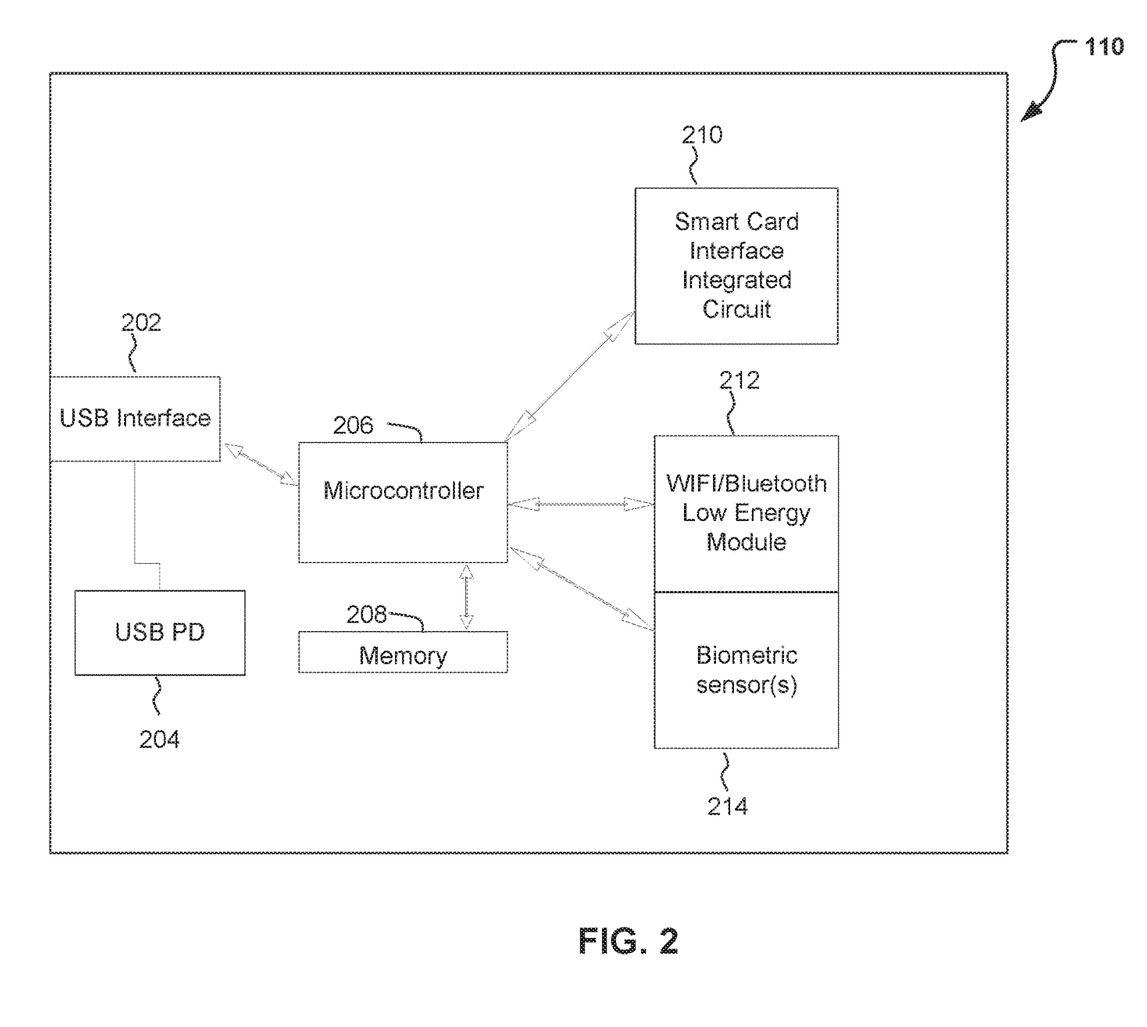
FIG. 2 illustrates the components of the payment device of FIG. 1, in accordance with an embodiment.

FIG. 2 illustrates the components of payment device 110, in accordance with an embodiment. In the example embodiment, payment device 110 includes universal serial bus (USB) interface 202 which may be coupled to USB power delivery (PD) 204. In the example embodiment, USB interface 202 may connect to a male USB-C or micro USB connector. In other embodiments, USB interface 202 may connect to a different type of USB male connector. Furthermore, in the example embodiment, USB PD 204 may allow for an external device to be charged via a USB-C/micro USB connection by payment device 110 and may also allow for payment device 110 to be charged by an external device. In the example embodiment, payment device 110 may also include smart card interface integrated circuit (IC) 210. In the example embodiment, upon insertion of an EMV instrument, such as a credit card containing an EMV chip, smart card interface IC 210 may read the EMV chip and forward the payment instrument information to microcontroller 206. Furthermore, as shown in FIG. 2, microcontroller 206 may communicate information, such as the received payment information, to other devices, such as computing device 120 via USB interface 202. In addition, in the example embodiment, payment device 110 may include WIFI/Bluetooth Low Energy Module 212 which may allow payment device 110 to communicate with other devices via WIFI or via a Bluetooth connection. Furthermore, as depicted, payment device 110 may include biometric sensor 214 which may allow payment device 110 to receive biometric information, such as fingerprint information. Received biometric information and information received via WIFI/Bluetooth Low Energy Module 212 may be communicated to one or more other devices via microcontroller 206. In the example embodiment, payment device 110 may also include memory 208.

Figure 3:
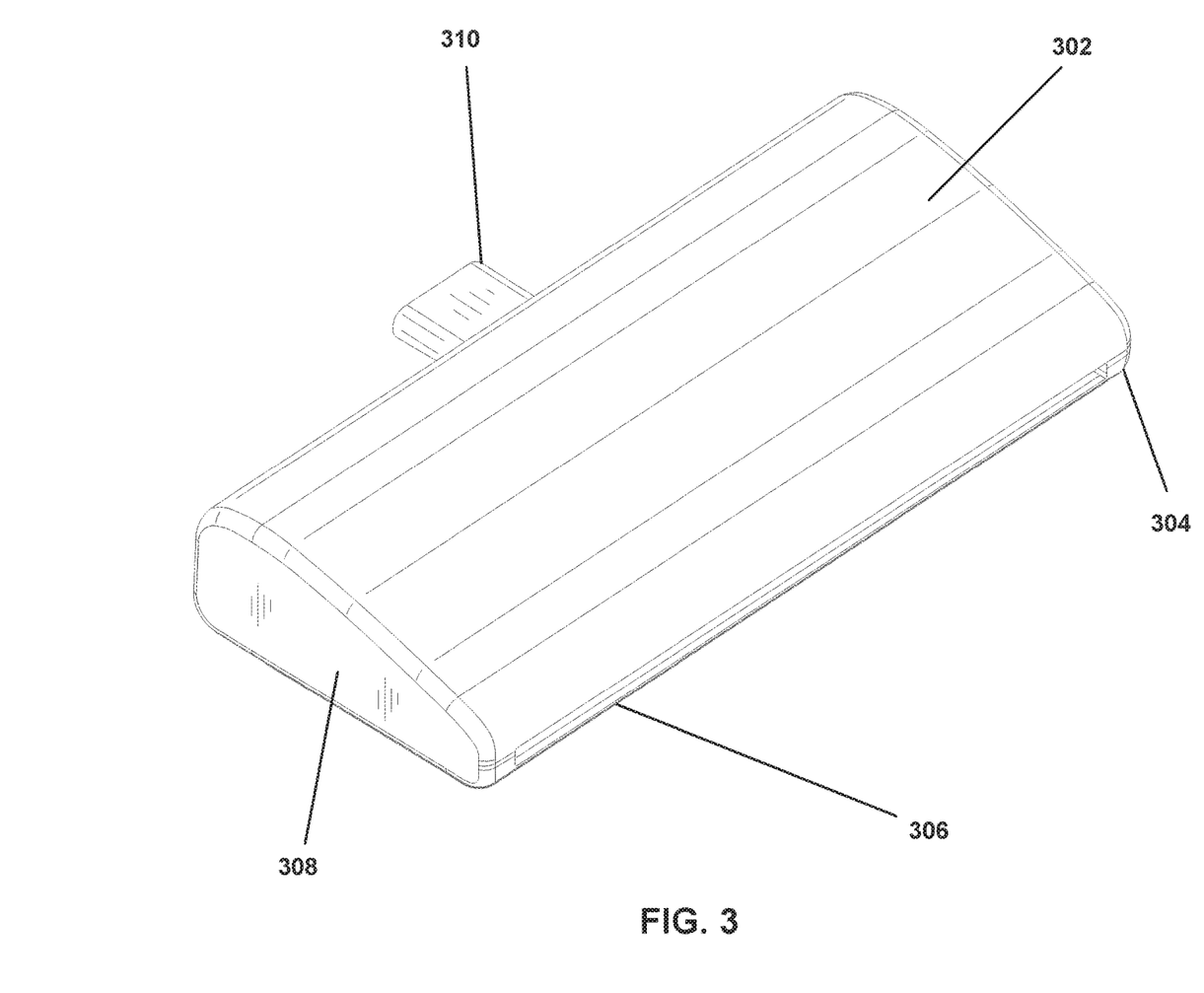
FIG. 3 illustrates a first view of the payment device of FIG. 1, in accordance with an embodiment.

FIG. 3 illustrates a first view of the payment device of FIG. 1, in accordance with an embodiment. In the example embodiment, FIG. 3 depicts a first view of payment device that includes male connector 310 that is located on top of (and adjacent to) a back surface of (a housing of) payment device 110. In the example embodiment, male connector 310 is a USB-C or micro-USB male connector that is capable of fitting into a female USB-C or micro-USB connector located on another device, such as computing device 120. Furthermore, in the example embodiment, the first view depicts a side surface 308 of payment device 110, a top surface 302 of payment device 110, and a front surface 304 of payment device 110. In the example embodiment, the top surface 302 may be slope downwards in the direction of front surface 304 so that the distance between top surface 302 and the bottom surface of payment device 110 is smaller when near front surface 304, as when compared to the distance between top surface 302 and the bottom surface of payment device 110 when near the back surface of payment device 110. In other embodiments, top surface 302 may not slope downward, and may instead run parallel to the bottom surface of payment device 110, or in further embodiments, may slope upwards in the direction of front surface 304.

In addition, in the example embodiment, the first view of payment device 110 depicts a slot 306 that is located adjacent to front surface 304. In the example embodiment, slot 306 is surrounded by portions of front surface 304 (front surface 304 is located to the left, right, above and below slot 306). In other embodiments, slot 306 may be located adjacent to two walls or portions of front surface 304, or in other embodiments, adjacent to a single wall or portion of front surface 304.

Figure 4:
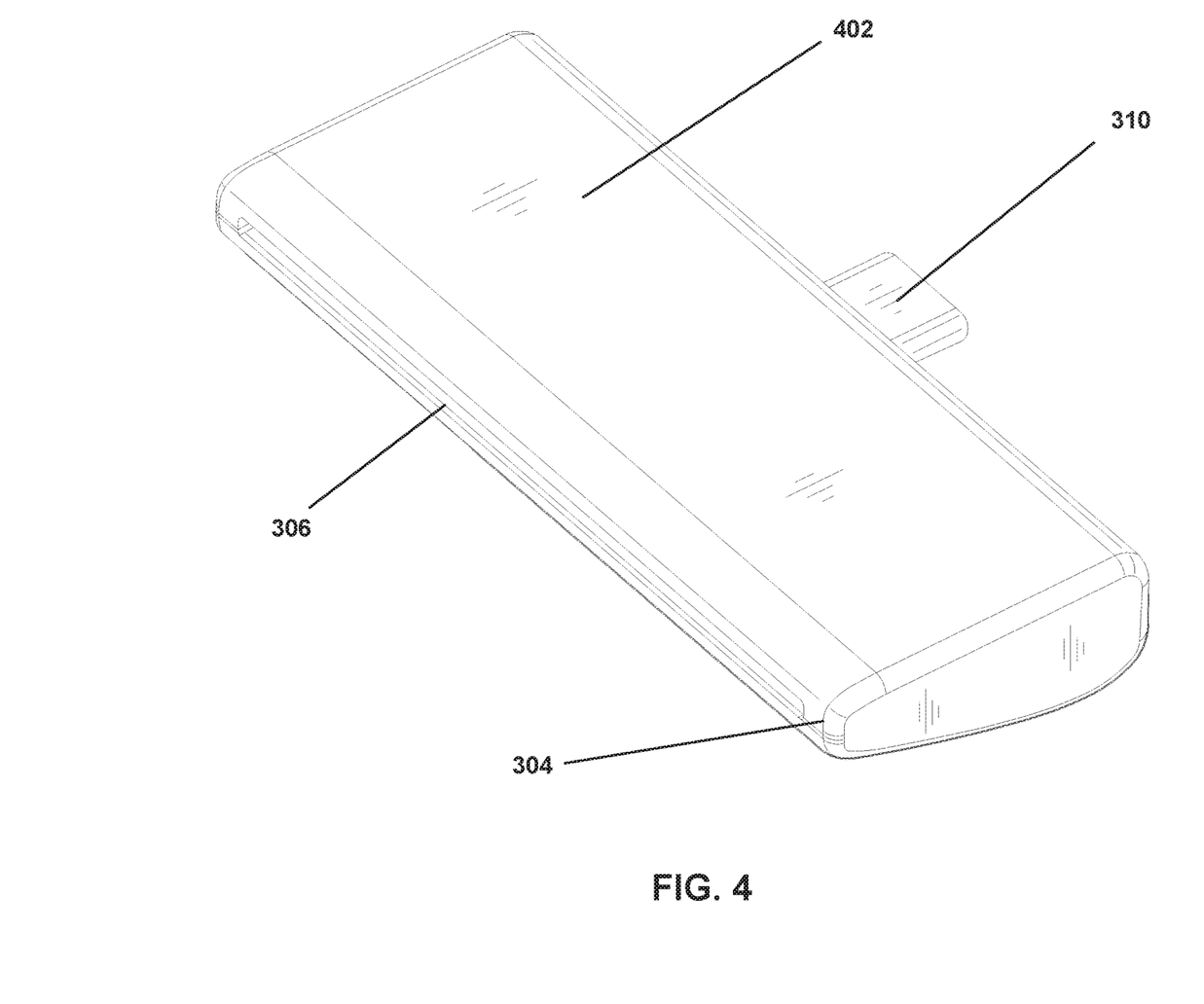
FIG. 4 illustrates a second view of the payment device of FIG. 1, in accordance with an embodiment.

FIG. 4 illustrates a second view of payment device 110, in accordance with an embodiment. In the example embodiment, the second view of payment device 110 depicts a bottom surface 402 of payment device 110 as well as male connector 310, slot 306, and front surface 304. In the example embodiment, bottom surface 402 may be a flat surface, however, in other embodiments, bottom surface 402 may sloped upwards or downwards towards front surface 304.

Figure 5:
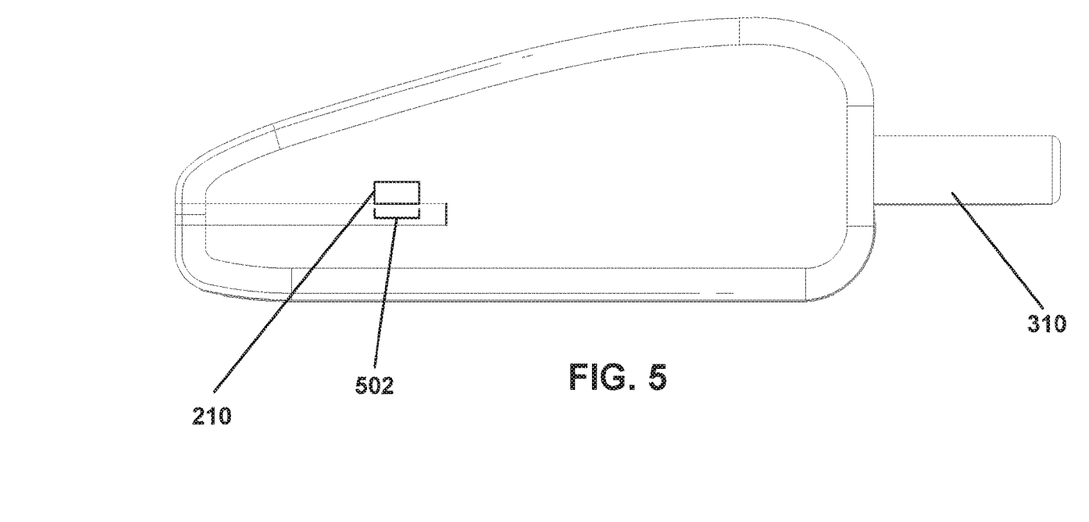
FIGS. 5 and 6 illustrates a third view and a fourth view of the payment device of FIG. 1, in accordance with an embodiment.
Figure 6:
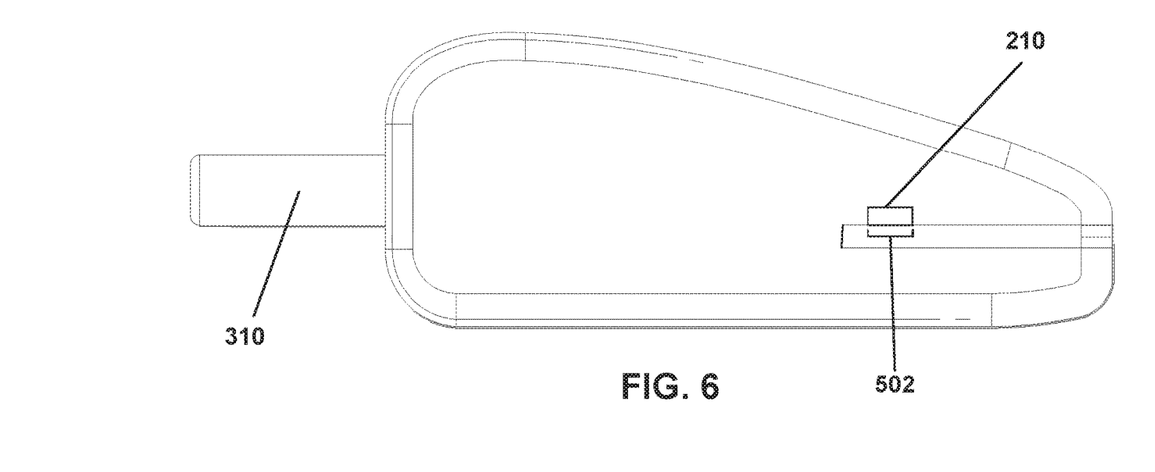

FIGS. 5 and 6 illustrates a third view and a fourth view of payment device 110, in accordance with an embodiment. In the example embodiment, the third view and the fourth view depict a side view of the inside of payment device 110. In the example embodiment, the third view and the fourth view depict smart card interface IC 210 which is located inside of payment device 110 on top of a portion of slot 306. In the example embodiment, the depth of slot 306 as depicted in FIGS. 5 and 6 is configured to be the depth necessary so that an EMV chip located on a payment instrument that is inserted into slot 306 is in position to make contact with smart card interface 210. In the example embodiment, position 502 may be the location of at least a portion of an EMV chip of a payment instrument inserted in slot 306.

Figure 7:
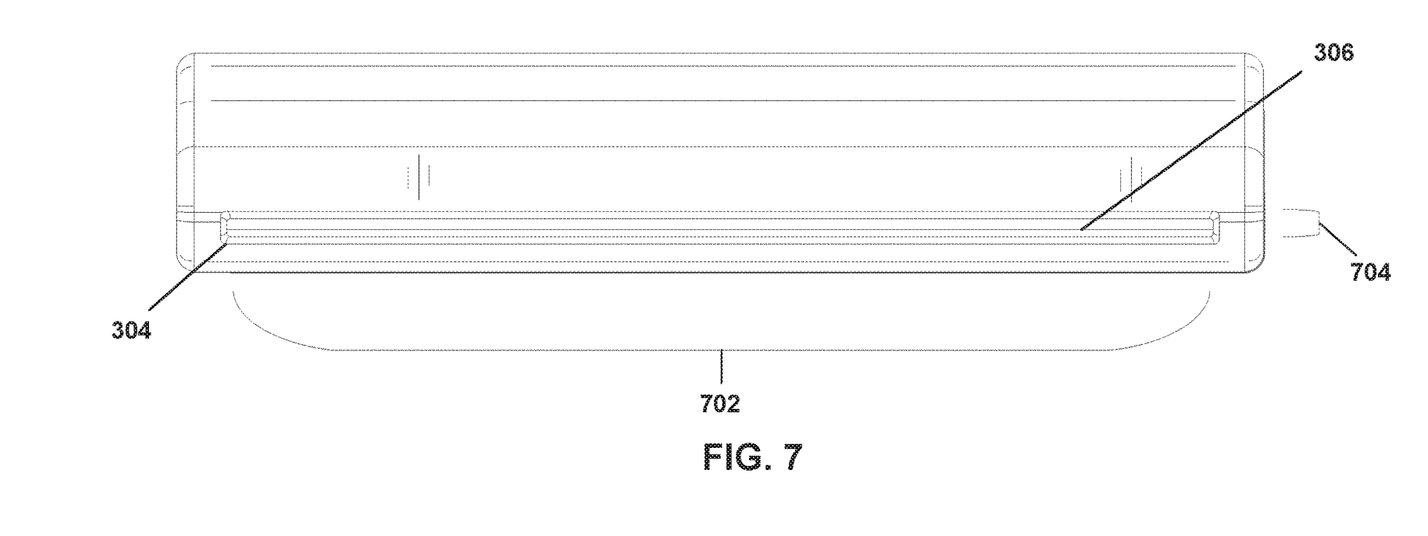
FIGS. 7 and 8 illustrates a fifth and sixth view of the payment device of FIG. 1, in accordance with an embodiment.
Figure 8:
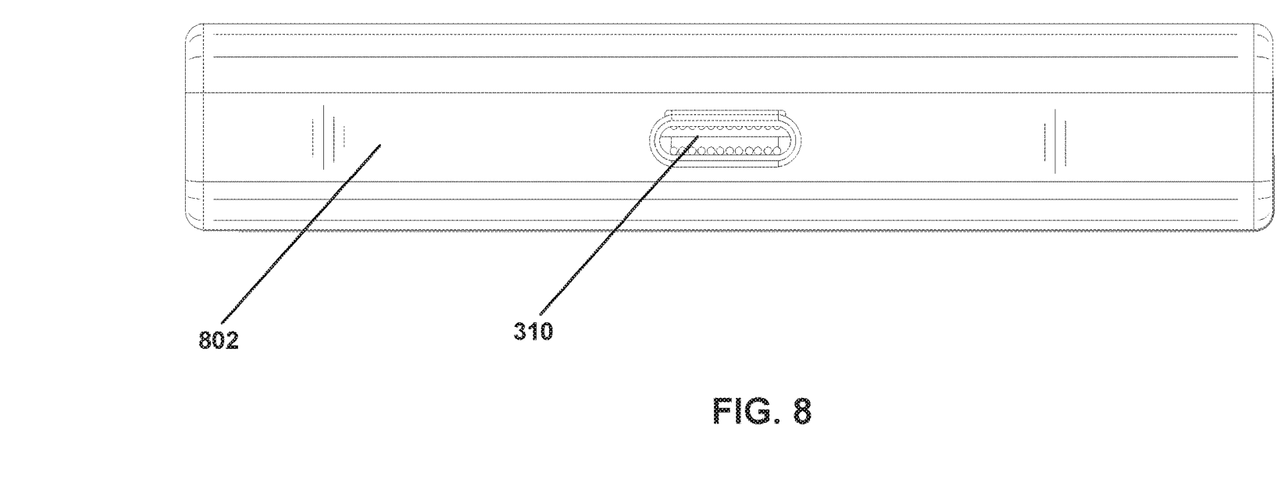

FIGS. 7 and 8 illustrates a fifth and sixth view of the payment device of FIG. 1, in accordance with an embodiment. In the example embodiment, the fifth view is a front view of payment device 110. In the example embodiment, the fifth view depicts slot 306 surrounded by portions of front surface 304. Furthermore, in the example embodiment, the length 702 and the height 704 of slot 306 are depicted. In the example embodiment, the height 704 of slot 306 may be less than 1 mm, to allow for a credit card to fit tightly within the opening provided by slot 306, but still minimize friction caused by inserting and pulling out a card. In further embodiments, the height 704 of slot 306 may be 1 mm or greater. Furthermore, the length 702 may be less than 54 mm to allow for a credit card or similar instrument to fit tightly within the opening provided by slot 306. In other embodiments, the length 702 may be 54 mm or greater.

In one specific example, the height 704 of slot 306 may be 0.88 mm (or within a threshold percentage of that value, such as within 10% of 0.88 mm) and the length 702 may be 54.28 mm (or within a threshold percentage of that value, such as within 1% of 54.28 mm). In this example, as stated above, the height and length of slot 306 provides an opening that allows a card to be inserted and removed while creating minimum friction. If friction is minimized, the chances of payment device 110 being pulled out computing device 120 when a card is removed is also minimized. This may be especially important if payment device 110 is connected to computing device 120 via a USB-C connection, because in some cases, a USB-C connection may provide less resistance when being pulled than other types of connections, such as a micro-USB connection.

In the example embodiment, the sixth view is a back view of payment device 110. In the example embodiment, the sixth view depicts back surface 802 and male connector 310. In the example embodiment, male connector 310 is located on and adjacent to back surface 802, as depicted. Furthermore, as stated above, male connector 310 is configured to allow for connection to other computing devices, such as computing device 120, via a corresponding female connector (such as a female USB-C or micro-USB connector). In addition, in the example embodiment, the size of male connector 310 is configured in such a way that, when male connector 310 is inserted into a corresponding female connector of another computing device, such as computing device 120, a portion of back surface 802 may make contact with a portion of a surface of the other computing device. In other embodiments, rather than making contact with a portion of a surface of the other computing device, the size of male connector 310 is configured in a way such that, when male connector 310 is inserted into a corresponding female connector of another computing device, a portion of back surface 802 is within a 1 cm distance of a portion from a surface of the other computing device. In other embodiments, the size of male connector 310 may be so that, when male connector 310 is inserted into a corresponding female connector of another computing device, a portion of back surface 802 is within a 2 cm distance, a 3 cm distance, or a greater distance from portion of a surface of the other computing device.

Figure 9:
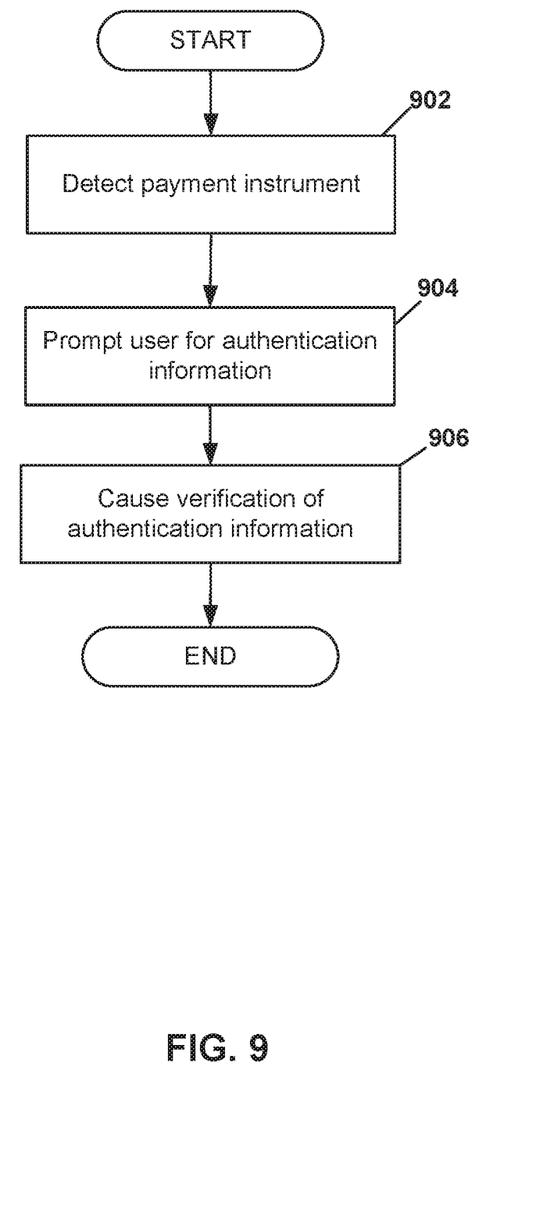
FIG. 9 is a flowchart illustrating the operations of the client payment application of FIG. 1 in facilitating the authentication of a user, in accordance with an embodiment.

FIG. 9 is a flowchart illustrating the operations of client payment application 122 in facilitating the authentication of a user, in accordance with an embodiment. In the example embodiment, client payment application 122 may detect a payment instrument has been inserted into payment device 110 via communication with payment device 110 (step 902). In the example embodiment, upon the insertion of a payment instrument into payment device 110, smart card interface IC 210 may read payment information from an EMV chip located on the payment instrument. Smart card interface IC 210 may then communicate the payment information to microcontroller 206 which in turn may transmit the payment information to client payment application 122 via USB interface 202. In the example embodiment, with regard to the operations in FIG. 9, payment device 110 is connected to computing device 120 via a USB-C or micro-USB connection.

In one or more embodiments, if payment device 110 detects an error in reading the inserted payment instrument, payment device 110 (via microcontroller 206) may transmit a signal to computing device 120 to cause an application, such as client payment application 122, that is capable of taking pictures to launch so a picture of the payment instrument may be taken.

In the example embodiment, upon detection of the payment instrument, client payment application 122 may prompt the user associated with the payment instrument for authentication information (step 904). In the example embodiment, client payment application 122 may provide an interface on computing device 120 to prompt the user associated with the payment instrument for authentication information. In one or more embodiments, client payment application 122 may utilize a fingerprint reader on computing device 120 to receive fingerprint information, or in further embodiments, may prompt the user associated with the payment instrument to provide user identification information via the interface provided on computing device 120. In other embodiments, client payment application 122 may utilize a fingerprint reader located on payment device 110 to obtain fingerprint information from the user associated with the payment instrument.

In additional embodiments, upon the detection by microcontroller 206 that a payment instrument has been inserted into payment device 110, microcontroller 206 may transmit a signal to computing device 120 that may cause client payment application 122 to launch and provide the interface described above.

In the example embodiment, client payment application 122 may transmit received authentication information to payment application 142 to cause a verification process of the received authentication information (step 906). In the example embodiment, if payment application 142 determines that the authentication information has been verified, payment application 142 may cause a payment associated with the verification request to be processed. If the payment is processed, a notification may be transmitted to client payment application 122, which may in turn display the notification to the user associated with the payment instrument. If the authentication information is not verified, payment application 142 may cause the payment to be denied and may further transmit a notification that the payment was denied to client payment application 122.

In the example embodiment, payment application 142 may refer to database 144 to identify if received authentication information corresponds to authentication information stored in association to the user associated with the payment instrument.

Figure 10:
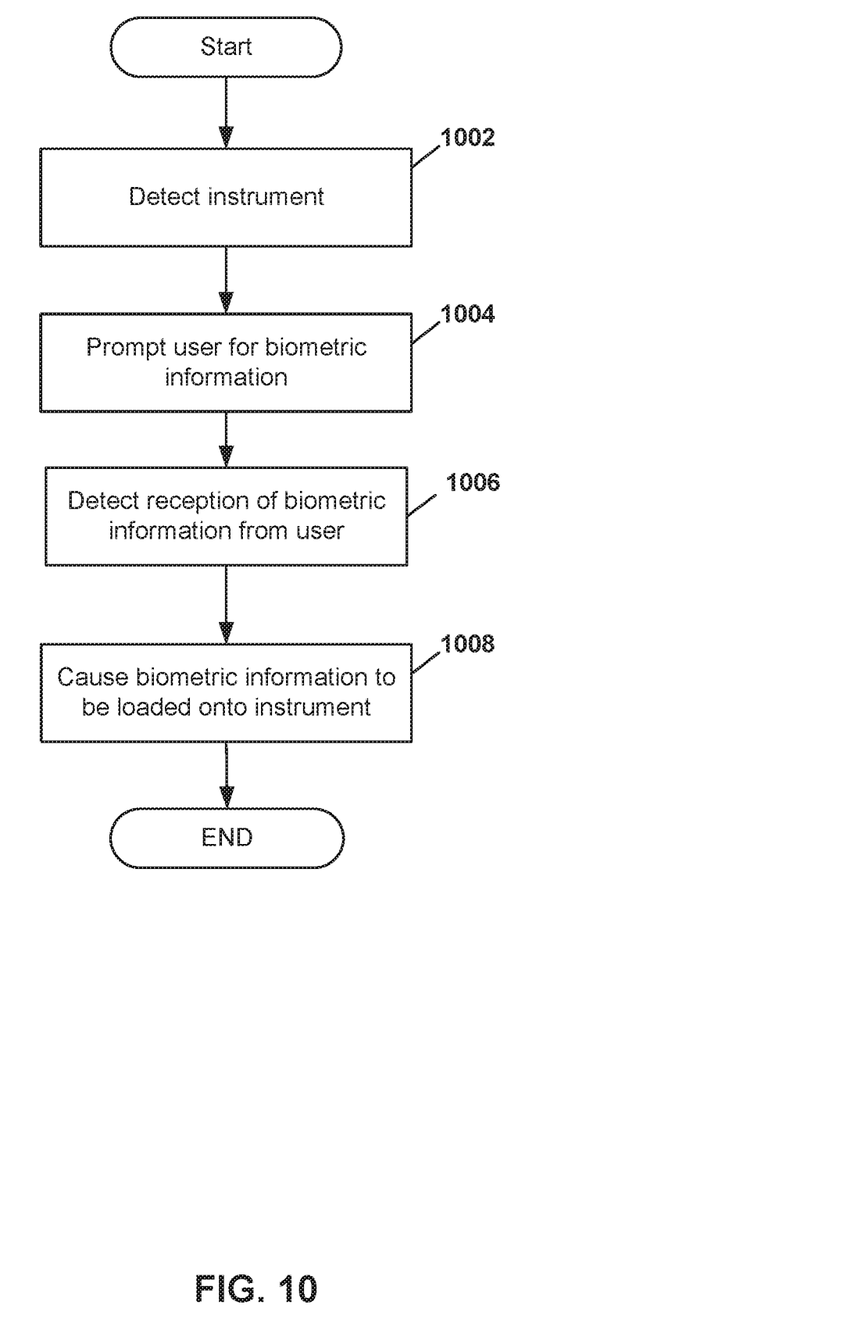
FIG. 10 is a flowchart illustrating the operations of the client payment application of FIG. 1 in utilizing the payment device of FIG. 1 to load biometric information to a user instrument, in accordance with an embodiment.

FIG. 10 is a flowchart illustrating the operations of client payment application 122 in utilizing payment device 110 to load biometric information to a user instrument, in accordance with an embodiment. In the example embodiment, client payment application 122 may detect a user instrument has been inserted into payment device 110 via communication with payment device 110 (step 1002). In the example embodiment, as stated above, upon the insertion of a user instrument into payment device 110, smart card interface IC 210 may read information from an EMV chip located on the user instrument. Smart card interface IC 210 may then communicate the user instrument information to microcontroller 206 which in turn may transmit the user instrument information to client payment application 122 via USB interface 202. In the example embodiment, with regard to the operations in FIG. 10, payment device 110 is connected to computing device 120 via a USB-C or micro-USB connection. In the example embodiment, a user instrument may include a payment instrument, a user identification card, another type of financial instrument, or another user instrument.

In the example embodiment, upon detection of the user instrument, client payment application 122 may prompt the user associated with the user instrument for biometric information (step 1004). In the example embodiment, client payment application 122 may provide an interface on computing device 120 to prompt the user associated with the user instrument for authentication information. In one or more embodiments, client payment application 122 may utilize a biometric component, such as a fingerprint reader on computing device 120, to receive biometric information, or in further embodiments, may prompt the user associated with the user instrument to provide biometric information via the interface provided on computing device 120. In other embodiments, client payment application 122 may utilize a biometric component, such as a fingerprint reader located on payment device 110, to obtain biometric information from the user associated with the user instrument.

In the example embodiment, client payment application 122 may detect reception of biometric information from the user associated with the user instrument (step 1006), and based on reception of the biometric information, may transmit the biometric information to microcontroller 206 and cause the biometric information to be loaded onto the EMV chip of the user instrument (step 1008). In addition, a user database, such as database 144 may be updated, by client payment application 122 or payment application 142 to associate the biometric information with the user.

In additional embodiments, upon the detection by microcontroller 206 that a user instrument has been inserted into payment device 110, microcontroller 206 may transmit a signal to computing device 120 that may cause client payment application 122 to launch and provide the interface described above.

In other embodiments, payment device 110, such as microcontroller 206 may detect the insertion of the payment instrument as described above (such as via smart card interface IC 210) and may further prompt the user for biometric information via an indication signal or via a display located on payment device 110. In one or more embodiments, the indication signal may include a visual signal, such as a light indicator, an audio signal, or a haptic signal. Furthermore, microcontroller 206 may detect reception of the biometric information from the user associated with the user instrument and may cause the biometric information to be loaded onto an EMV chip located on the user instrument.

In further embodiments, payment device 110 may include logic that may detect if a payment instrument corresponding to one or more user profiles has been inserted into slot 306. For example, a single payment instrument may correspond to multiple users, such as a father and son, with each user having different spending limits and restrictions. Each profile may correspond to a fingerprint or other biometric information, so that when the payment instrument is utilized, a point of sale terminal may require the input of the associated biometric information in order for a determination to be made as to which user is utilizing the payment instrument. Therefore, if the payment instrument is inserted into a point of sale terminal and the father inputs his fingerprint, the spending limits associated with the father would be determined to be applicable to the transaction. Furthermore, fraud determinations, and other payment related terminations may be at least partially based on transactional activity associated with the user profile. Therefore, for this type of payment instrument, payment device 110 may be utilized to create the profiles by allowing for fingerprint or biometric information to be loaded onto the payment instrument during activation (in the manner described above).

In other embodiments, payment device 110 may be used in conjunction with computing device 120 to associate a profile on a payment instrument with a fingerprint or alter/change a fingerprint associated with an existing profile. For example, client payment application 122 may be launched on computing device 120 (with computing device 120 connected via male connector 310 to payment device 110) and further the payment instrument may be inserted into payment device 110. In one or more embodiments, client payment application 122 may detect the insertion of the payment instrument and further provide the user with the option of creating a profile or altering an existing profile. The user may then utilize a fingerprint reader located on computing device 120 or on payment device 110 to provide fingerprint information and associate the provided fingerprint information with a user profile. Client payment application 122 may then transmit the profile information to payment device 110 and payment device 110 may then load the profile information onto an EMV chip of the payment instrument. In other embodiments, the same steps may be followed to load a profile onto a user instrument or an instrument that is not used for payments.

Figure 11:
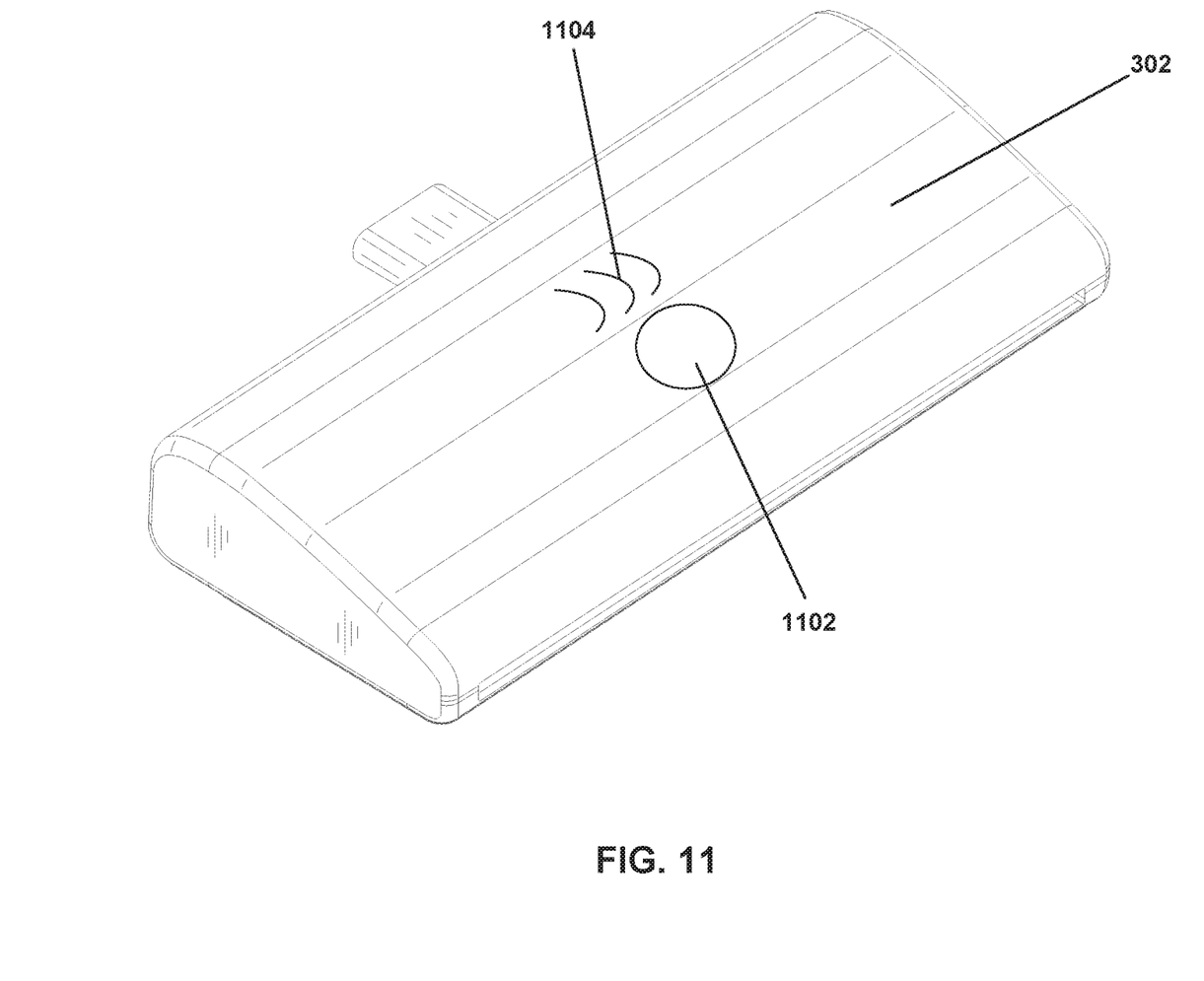
FIG. 11 illustrates a view of a first alternative embodiment of the payment device of FIG. 1, in accordance with an embodiment.

FIG. 11 illustrates a view of a first alternative embodiment of payment device 110, in accordance with an embodiment. In the example embodiment, the first alternative embodiment of payment device 110 includes contactless component 1104 which may utilize a radio-frequency identification (RFID) reader/component or a near field communication (NFC) component to detect the presence of a contactless card (such as a contactless credit card) or a mobile phone/electronic device that is being utilized to provide a payment. In the example embodiment, contactless component 1104 may communicate with microcontroller 206 in order to transmit payment information to another computing device, such as computing device 120, as described above. In the example embodiment, the first alternative embodiment of payment device 110 includes fingerprint reader 1102. In the example embodiment, fingerprint reader 1102 allows for the reception of fingerprint information from a user associated with a payment instrument being utilized with payment device 110. In the example embodiment, fingerprint reader 1102 may allow for additional authentication information to be received by payment device 110 for the purposes of verification or may be utilized as described above to load biometric or fingerprint information onto a user instrument, such as a credit card to provide an additional layer of security. As depicted in FIG. 11, fingerprint reader 1102 and contactless component 1104 may be located on top surface 302, however, in other embodiments, may be located on a different surface of payment device 110.

Figure 12:
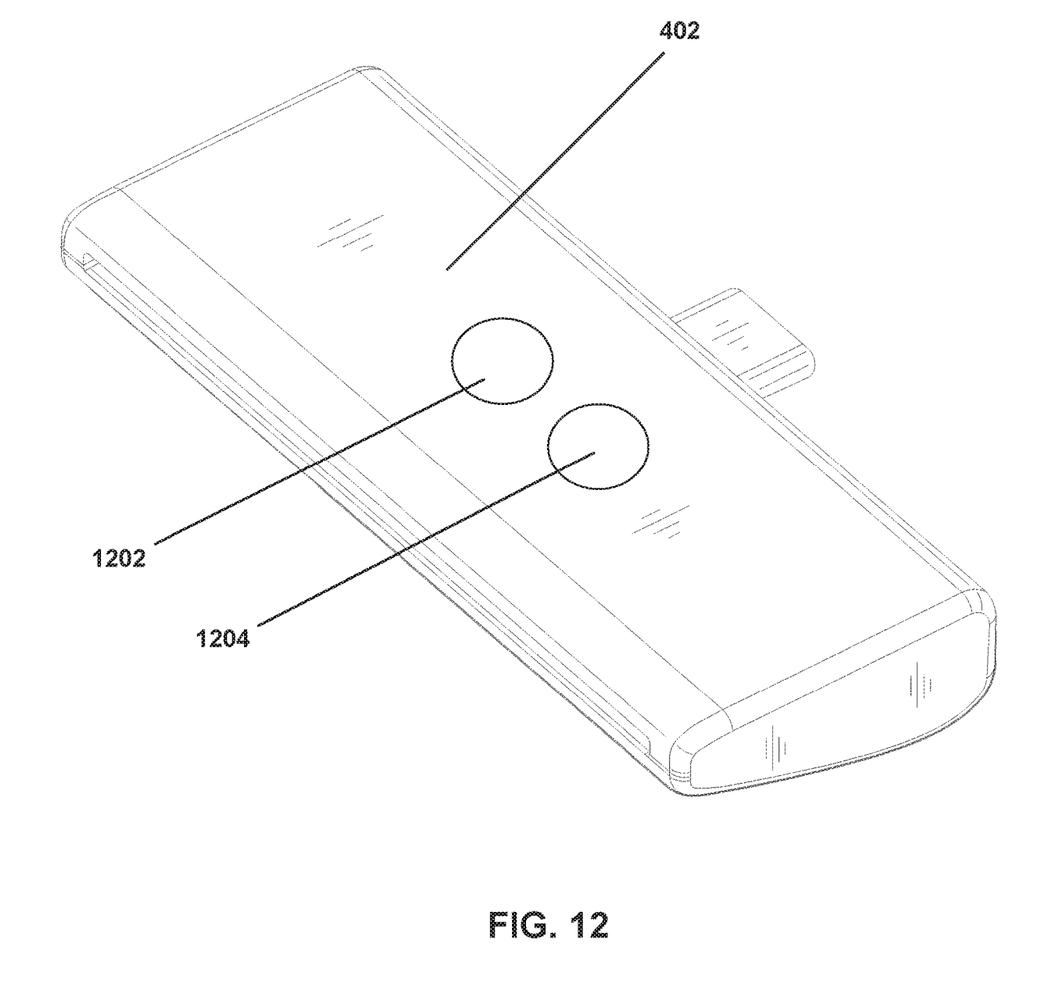
FIG. 12 illustrates a view of a second alternative embodiment of the payment device of FIG. 1, in accordance with an embodiment.

FIG. 12 illustrates a view of a second alternative embodiment of payment device 110, in accordance with an embodiment. In the example embodiment, the second alternative embodiment includes fingerprint readers 1202 and 1204. In the example embodiment, the second alternative embodiment may include two additional fingerprint readers 1202 and 1204 that are located on bottom surface 402 in addition to the fingerprint reader 1102 located on top surface 302. In other embodiments, fingerprint readers 1202 and 1204 may be present on payment device 110 without additional fingerprint readers being present on payment device 110. While FIG. 12 depicts fingerprint readers 1202 and 1204 being located on bottom surface 402, in other embodiments, fingerprint readers 1202 and 1204 may be located on a different surface of payment device 110.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Furthermore, this specification includes references to "the example embodiment," "other embodiments," "one or more embodiments, "further embodiments", "additional embodiments", and the like. The appearances of these phrases do not necessarily refer to the same embodiment. Particular features, structures, or characteristics may be combined in any suitable manner consistent with this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features.

Figure 13:
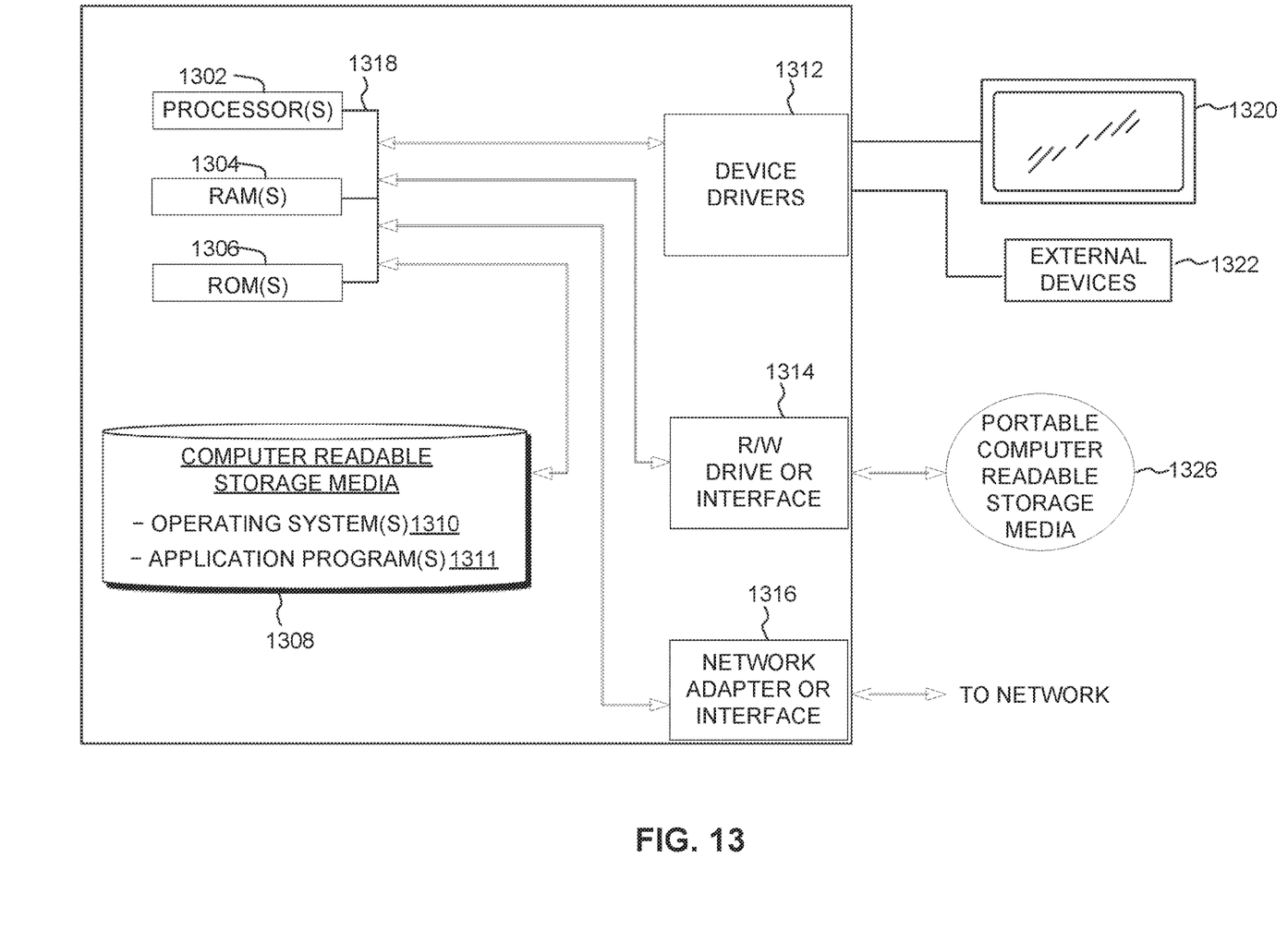
FIG. 13 is a block diagram depicting the hardware components of the payment system of FIG. 1, in accordance with an embodiment.

FIG. 13 depicts a block diagram of components of one or more devices of payment system 100, such as computing device 120, in accordance with an embodiment. It should be appreciated that FIG. 13 provides only an illustration of one implementation and does not imply any limitations with regard to the environments in which different embodiments may be implemented. Many modifications to the depicted environment may be made. In the example embodiment, as depicted, payment device 110 may include the components described in FIG. 2, however in one or more embodiments, payment device 110 may include one or more of the components depicted in FIG. 13 as well.

Computing devices may include one or more processors 1302, one or more computer-readable RAMs 1304, one or more computer-readable ROMs 1306, one or more computer readable storage media 1308, device drivers 1312, read/write drive or interface 1314, network adapter or interface 1316, all interconnected over a communications fabric 1318. Communications fabric 1318 may be implemented with any architecture designed for passing data and/or control information between processors (such as microprocessors, communications and network processors, etc.), system memory, peripheral devices, and any other hardware components within a system.

One or more operating systems 1310, and one or more application programs 1311, for example, payment application 142, are stored on one or more of the computer readable storage media 1308 for execution by one or more of the processors 1302 and by utilizing one or more of the respective RAMs 1304 (which typically include cache memory). In the illustrated embodiment, each of the computer readable storage media 1308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 1314 to read from and write to one or more portable computer readable storage media 1326. Application programs 1311 on the computing devices may be stored on one or more of the portable computer readable storage media 1326, read via the respective R/W drive or interface 1314 and loaded into the respective computer readable storage media 1308.

Computing devices may also include a network adapter or interface 1316, such as a TCP/IP adapter card or wireless communication adapter (such as a 4G wireless communication adapter using OFDMA technology). Application programs 1311 on the computing devices may be downloaded to the computing devices from an external computer or external storage device via a network (for example, the Internet, a local area network or other wide area network or wireless network) and network adapter or interface 1316. From the network adapter or interface 1316, the programs may be loaded onto computer readable storage media 1308. The network may comprise copper wires, optical fibers, wireless transmission, routers, firewalls, switches, gateway computers and/or edge servers.

Computing devices may also include a display screen 1320, and external devices 1322, which may include, for example a keyboard, a computer mouse and/or touchpad. Device drivers 1312 interface to display screen 1320 for imaging, to external devices 1322, and/or to display screen 1320 for pressure sensing of alphanumeric character entry and user selections. The device drivers 1312, R/W drive or interface 1314 and network adapter or interface 1316 may comprise hardware and software (stored on computer readable storage media 1308 and/or ROM 1306).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A payment device, comprising:
a housing;
a slot for insertion of a user instrument located on a front surface of the housing, and wherein the housing includes a smart card interface integrated circuit (IC) that is configured to read an EMV chip located on the user instrument; and
a universal serial bus (USB) type C or micro-USB male connector configured to be inserted into a female connector on a computing device, wherein the USB type C or micro-USB male connector is located on a back surface of the housing, and wherein a size of the USB type C or micro-USB male connector is configured so that when the USB type C or micro-USB male connector is inserted into the female connector on the computing device, the back surface of the housing is within a distance of two centimeters of a surface of the computing device, and wherein the payment device is configured to cause an image of the user instrument inserted into the slot to be captured when the payment device detects an error in reading the user instrument.

2. The payment device of claim 1, wherein the slot for insertion of the user instrument has a height of less than one millimeter.

3. The payment device of claim 1, further comprising a fingerprint reader located on a top surface of the payment device.

4. The payment device of claim 3, further comprising two or more fingerprint readers located on a bottom surface of the payment device.

5. The payment device of claim 1, further comprising a contactless component that is configured to communicate with a radio frequency identification tag located on the user instrument.

6. The payment device of claim 1, the smart card interface IC is configured to cause a payment authentication request to be transmitted to a payment service provider in response to reading payment information from the EMV chip located on the user instrument.

7. The payment device of claim 1, wherein—the smart card interface IC is configured to cause a request for biometric information to be provided to a user associated with the user instrument in response to detecting an insertion of the user instrument into the slot of the payment device.

8. The payment device of claim 7, wherein, in response to detecting a reception of the biometric information from the user associated with the user instrument, a microcontroller of the payment device is configured to load the biometric information onto the user instrument.

9. A system, comprising:
a non-transitory memory; and
a microprocessor coupled with the non-transitory memory and configured to read instructions from the non-transitory memory to cause the system to perform operations comprising:
detecting an insertion of a user instrument into a slot located on a front surface of a housing of a payment device;
causing, in response to the detecting, a computing device to request authentication information of a user associated with the user instrument, wherein:
the housing includes a smart card interface integrated circuit (IC) that is configured to read an EMV chip located on the user instrument; and
the payment device includes a universal serial bus (USB) type C or micro-USB male connector that
(i) is located on a back surface of the housing and configured to be inserted into a female connector on the computing device; and
(ii) has a size such that when the USB type C or micro-USB male connector is inserted into the female connector on the computing device, the back surface of the housing is within a distance of two centimeters of a surface of the computing device; and
causing an image of the user instrument inserted into the slot to be captured in response to the payment device detecting an error in reading the user instrument.

10. The system of claim 9, wherein the slot for insertion of the user instrument has a height of less than one millimeter.

11. The system of claim 9, wherein the payment device comprises a fingerprint reader located on a top surface of the payment device.

12. The system of claim 11, wherein the payment device comprises two or more fingerprint readers located on a bottom surface of the payment device.

13. The system of claim 9, wherein the payment device comprises a contactless component that is configured to communicate with a radio frequency identification tag located on the user instrument.

14. The system of claim 9, wherein the smart card interface IC is configured to cause a payment authentication request to be transmitted to a payment service provider in response to reading payment information from the EMV chip located on the user instrument.

15. The system of claim 9, wherein the authentication information is biometric information.

16. The system of claim 15, wherein the operations further comprise loading the biometric information onto the user instrument in response to detecting a reception of the biometric information from the user associated with the user instrument.

17. A method, comprising:
detecting, by a microprocessor, an insertion of a user instrument into a slot located on a front surface of a housing of a payment device;
causing, by the microprocessor and in response to the detecting, a computing device to request for authentication information of a user associated with the user instrument, wherein:
the housing includes a smart card interface integrated circuit (IC) that is configured to read an EMV chip located on the user instrument; and
the payment device includes a universal serial bus (USB) type C or micro-USB male connector that (i) is located on a back surface of the housing and configured to be inserted into a female connector on the computing device; and (ii) has a size such that when the USB type C or micro-USB male connector is inserted into the female connector on the computing device, the back surface of the housing is within a distance of two centimeters of a surface of the computing device; and causing, by the microprocessor, an image of the user instrument inserted into the slot to be captured in response to the payment device detecting an error in reading the user instrument.

18. The method of claim 17, wherein the slot for insertion of the user instrument has a height of less than one millimeter.

19. The method of claim 17, wherein the payment device comprises a fingerprint reader located on a top surface of the payment device.

20. The method of claim 17, wherein the payment device comprises a contactless component that is configured to communicate with a radio frequency identification tag located on the user instrument.

21. The method of claim 17, wherein the authentication information is biometric information.

* * * * *